(12) United States Patent
Cameron et al.

(10) Patent No.: US 6,534,605 B2
(45) Date of Patent: Mar. 18, 2003

(54) LIVING POLYMERIZATION PROCESS

(75) Inventors: Paul Alexander Cameron, Northallerton (GB); Vernon Charles Gibson, London (GB); Derek John Irvine, Stockton on Tees (GB)

(73) Assignee: Imperial Chemical Industries Plc, London (GB)

(*) Notice: Subject to any disclaimer, the term of this patent is extended or adjusted under 35 U.S.C. 154(b) by 0 days.

(21) Appl. No.: 09/750,222

(22) Filed: Dec. 29, 2000

(65) Prior Publication Data

US 2001/0016638 A1 Aug. 23, 2001

Related U.S. Application Data

(63) Continuation of application No. PCT/GB99/01770, filed on Jun. 4, 1999.

(30) Foreign Application Priority Data

Jun. 29, 1998 (GB) .............................................. 9813939

(51) Int. Cl.$^7$ .................................................. C08F 4/44
(52) U.S. Cl. ...................... 526/125.1; 526/90; 526/96; 526/113; 526/125.6; 526/135; 526/139; 526/151; 526/154; 526/303.1; 526/319; 526/329.7
(58) Field of Search ............................... 526/329.7, 90, 526/96, 303.1, 125.6, 135, 139, 319, 151, 154, 113, 125.1

(56) References Cited

U.S. PATENT DOCUMENTS 5,668,234 A  9/1997  Rhodes ..................... 526/329.7

FOREIGN PATENT DOCUMENTS

WO  96/37529  11/1996

OTHER PUBLICATIONS

Takeuchi et al in the Journal "Macromolecules", 1995, 28(2), 651–2.*
Inoue et al Controlled Polymerization Reaction with New Catalyst: Design of Metalloporphyrin—Acid Systems for Monomer Activation, Macromol. Symp., 98, 163–170 (1995).*

Maruoka et al "Aluminum Tris (2,6–diphenylphenoxide) (ATPH) as an Efficient and Selective Activator for Inoue Polymerization.", SWynletter, 1995 (1), 81–2.*

Inoue et al., Metalloporphyrin Catalysts for Living and Immortal Polymerizations, Macromol. Symp. vol. 101, 1996 pp. 11–18.

* cited by examiner

Primary Examiner—Tatyana Zalukaeva
(74) Attorney, Agent, or Firm—Pillsbury Winthrop LLP

(57) ABSTRACT

A polymerization process for the preparation of vinylic polymers from the corresponding vinylic monomers which process comprises the step of reacting a vinylic monomer in the presence of a catalyst system comprising a) a compound of general formula (I) where M is any metal capable of coordinating to an enolate or delocalized enolate-like species; $B^1$, $B^2$, $B^3$ and $B^4$ are chosen from nitrogen, oxygen, sulphur or phosphorus containing moieties wherein each of said nitrogen, oxygen, sulphur or phosporus is linked to at least one carbon atom of an organic group and to M; $X^1$ is selected from the group consisting of alkyl, H, halogen, alkoxy, thiol aryloxy, ester, b) a metal, complex of general formula (II) where A is selected from the group consisting of nickel, iron, cobalt, chromium, manganese, titanium, zirconium, vanadium and the rare earth metals; $L^1$, $L^2$, $L^3$ and $L^4$ are ligands and c) a Lewis acid of general formula (III) wherein at least one of W, Y or Z is capable of forming a co-ordination bond with A and the others of W, Y and Z are bulky groups; D is selected from the group concsisting of aluminium, magnesium, zinc and boron

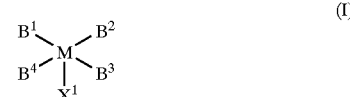 (I)

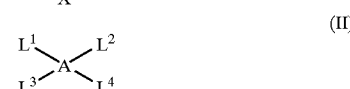

(II)

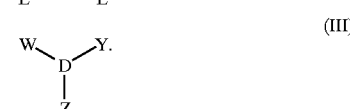

(III)

16 Claims, No Drawings

LIVING POLYMERIZATION PROCESS

This application is a condition of PCT/GB99/01770, filed Jun. 4, 1999.

The present invention relates to a living polymerisation-process for the preparation of vinylic polymers in the presence of a catalyst system.

Living or immortal polymerisation is a type of polymerisation that does not terminate naturally. Each initiator molecule produces one growing chain such that the polymer grows linearly with time. Therefore the degree of polymerisation can be controlled to some extent. This method has been developed by Inoue for the living polymerisation of both methacrylates and acrylates using aluminium porphyrins, of the general formula (TPP)AlX, as initiators with irradiation from a xenon arc (Polym. Prepr. Jpn. (English Edition) 1992, 41, E93(IIID-06) and E96(IIID-12)).

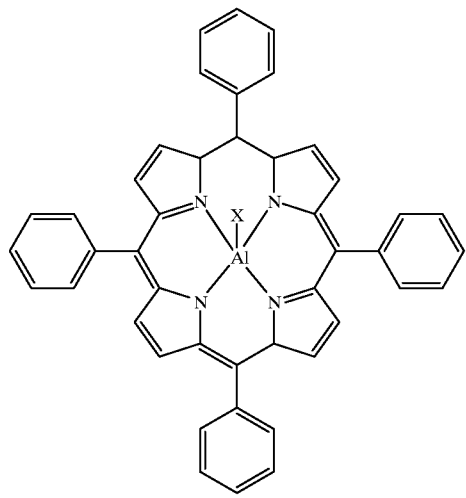

(TPP)AlX where $X=CH_3$ or $CH_2CH_2CH_3$

At ambient temperature each (TPP)AlX molecule was found to generate a polymer chain and excellent control of molecular weight was achieved.

Subsequently Inoue discovered that the further addition of a Lewis acid greatly enhances the rate of propagation. For example (TPP)AlMe initiated polymerisation of methyl-methacrylate (MMA), in the presence of irradiated light, was found to yield 6.1% polymethylmethacrylate after 2.5 hours. With the addition of a Lewis acid, for example a bulky aluminium phenoxide, there was quantitative polymerisation within 3 seconds. More recently Inoue has disclosed such systems where the presence of irradiated light is not required. For example (TPP)AlX, where X=SPropyl, initiated polymerisation of MMA in the presence of a Lewis acid, where there is complete monomer conversion after 1.5 minutes at 80° C. (T Kodeira and K Mori, Makromol. Chem. Rapid Commun. 1990,11, 645). However the molecular weights that have been produced with this system have been low, for example 22,000.

It is reported, by Inoue, that the initial reaction is of the (TPP)AlX complex with monomer to form an enolate initiator, in the presence of irradiated light. This enolate can then react with further monomer in the presence of the Lewis acid, as activator, to develop the polymer chain.

E. A. Jeffery et al, in Journal of Organometallic Chemistry (1974,74, p365,373), have disclosed the use of Nickel (acetylacetonate)$_2$ to catalyse the formation of aluminium enolates by encouraging 1,4-addition of trimethylaluminium to α,β-unsaturated ketones. Nickel complexes which catalyse the formation of enolates are relevant to polymerisations which proceed via a metal enolate including existing metallocene initiators based on samarium and zirconium.

It is an object of the invention to provide a catalyst system, for the polymerisation of vinylic monomers to the corresponding polymers, such that the polymerisation occurs quickly and in a controlled manner.

Accordingly the present invention provides a polymerisation process for the preparation of vinylic polymers from the corresponding vinylic monomers which process comprises the step of reacting a vinylic monomer in the presence of a catalyst system comprising a) a compound of general formula (I)

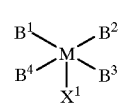

(I)

where M is any metal capable of coordinating to an enolate or delocalised enolate-like species; $B^1$, $B^2$, $B^3$ and $B^4$ are chosen from nitrogen, oxygen, sulphur or phosphorus containing moieties wherein each of said nitrogen, oxygen, sulphur or phosphorus is linked to at least one carbon atom of an organic group and to M; $X^1$ is selected from the group consisting of alkyl, H, halogen, alkoxy, thiol, aryloxy, ester, b) a metal complex of general formula (II)

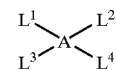

where A is selected from the group consisting of nickel, iron, cobalt, chromium, manganese, titanium, zirconium, vanadium and the rare earth metals; $L^1$, $L^2$, $L^3$ and $L^4$ are ligands and c) a Lewis acid of general formula (III)

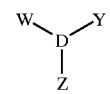

wherein at least one of W, Y or Z is capable of forming a co-ordination bond with A and the others of W, Y and Z are bulky groups; D is selected from the group consisting of aluminium, magnesium, zinc and boron.

By thiol in compound (I) we mean both SH and SR groupings where R includes alkyl, ester, ether.

The vinylic polymers that can be produced according to this invention include homo and copolymers of the corresponding vinylic monomers such as alkyl (alk)acrylic acid and esters thereof, functionalised alkyl(alk)acrylic acid and esters thereof, for example hydroxy, halogen, amine functionalised, styrene, vinyl acetates, butadiene. By (alk) acrylic, we mean that either the alkacrylic or the analogous acrylic may be used.

For both homo and copolymers the monomers are preferably alkyl (alk)acrylic acid and esters thereof, more preferably alkyl(meth)acrylates. These polymerisations can be conducted in such a way that architectural copolymers, for example block, ABA and stars, can be produced.

Polymerisation can be undertaken in the presence of a solvent, for example toluene, dichloromethane and tetrahydrofuran, or in the bulk monomer. The polymerisation is preferably undertaken at between −100 and 150° C., more preferably between −50 and 50° C., in particular between 15 to 40° C.

Without wishing to be limited by theory we believe that the reaction proceeds via an enolate or delocalised enolate-like intermediate. Therefore it is essential to the process of the present invention that the metal species in compound (I), M, can co-ordinate to an enolate or delocalised enolate-like species. The enolate and delocalised enolate-like species have structures as shown below,

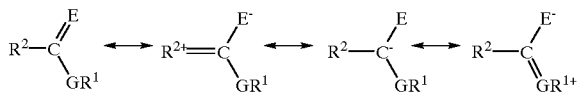

herein E and G are both O for the enolate species and either or both may be C or an electronegative element for the enolate-like species, $R^1$ and $R^2$ are typically alkyl groups.

M is preferably chosen from the metals aluminium, cobalt, copper, titanium or the lanthanide series, more preferably aluminium, cobalt, copper, titanium and specifically aluminium. The lanthanide series is defined as lanthanum, cerium, praseodymium, neodymium, promethium, samarium, europium, gadolinium, terbium, dysprosium, holmium, erbium, thulium, ytterbium, lutecium.

$X^1$ is preferably an alkyl group with preferably $C_1$ to $C_{10}$ carbon atoms.

Preferably the linkage of each of nitrogen, oxygen, sulphur or phosphorus to at least one carbon atom of an organic group is such that there is at least one linkage in compound (I) between any two of nitrogen, oxygen, sulphur or phosphorus comprising a bridging group of at least one carbon atom. Compound (I) may be a closed structure, i.e. a macrocycle where each of nitrogen, oxygen, sulphur or phosphorus are all linked to each other via linkages comprising a bridging structure of at least one carbon atom. Compound (I) is preferably an open structure, more preferably an open structure where there is an absence of a linkage, comprising a bridging group of at least one carbon atom, between at least one pair of the nitrogen, oxygen, sulphur or phosphorus such that there is directed access for the reactants to the M—$X^1$ bond. An example of compound (I) is N,N ethylenebis (salicylidene imine) methyl aluminium (structure IV below) and substituted derivatives of N,N ethylenebis (salicylidene imine) methyl aluminium, for example N,N ethylenebis (3,5-di-tertbutylsalicylidene imine) methyl aluminium.

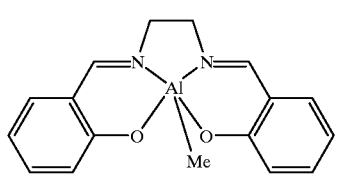

(IV)

In this example there is an absence of a linkage, comprising a bridging group of at least one carbon atom, between the two oxygens such that (IV) is sterically hindered to allow for directed access of reactants to the Al—Me bond.

It is preferred that the linking of nitrogen, oxygen, sulphur or phosphorus to the metal centre, M, of compound (I) is via covalent bonds.

The metal, A, in compound (II) is preferably iron, cobalt or nickel and more preferably nickel. The metal may exist in a variety of oxidation states, for example 0, 1, 2 or 3. The ligands $L^1$, $L^2$, $L^3$ and $L^4$ may be represented by all monodentate ligands, a combination of 2 mono and 1 bidentate where one pair of ligands from $L^1$, $L^2$, $L^3$ and $L^4$ represent a bidentate ligand and the other two ligands from $L^1$, $L^2$, $L^3$ and $L^4$ represent two separate monodentate ligands or 2 bidentate ligands. Preferably $L^1$, $L^2$, $L^3$ and $L^4$ represent 2 bidentate ligands, more preferably 2 bidentate acetylacetonate ligands or 2 bidentate cyclooctadiene ligands.

For compound (III) the grouping linked to D chosen from one of W, Y or Z, which itself is capable of forming a co-ordination bond with A, is preferably an alkyl group, with preferably $C_1$ to $C_{10}$ carbon atoms, and more specifically methyl. The remaining two groups are bulky and are preferably the same, in particular phenoxide or a substituted phenoxide or thiolate. D is preferably aluminium. Without wishing to be limited by theory we believe that the initial reaction involves transfer of this grouping chosen from one of W, Y or Z from D in compound (III) to the metal, A, in compound (II). Therefore it is essential to the process of the present invention that at least one of W, Y or Z is capable of forming a co-ordination bond with A.

Within the catalyst system the ratio of the number of moles of compound (I) to moles of compound (II) preferably ranges from 1:0.01 to 1:100, more preferably from 1:0.3 to 1:10. The ratio of the number of moles of compound (I) to moles of compound (III) preferably ranges from 1:0.1 to 1:100, more preferably from 1:0.3 to 1:10. Specifically preferred is a system where the ratio of number of moles of compound (I) to moles of compound (II) to moles of compound (III) is 1:1:3. These catalyst systems can be used according to the process of the invention for the polymerisation of monomer concentrations ranging from 1 to 20,000 moles relative to number of moles of compound (I).

Whilst it is acknowledged that the polymerisation time is dependent on monomer and solvent type, amongst other factors, typically polymerisation is complete in less than 5 minutes for homopolymers and a few hours for copolymers. The vinylic homo and copolymers produced by this method generally have polydispersity values of less than 1.7. The homo and copolymers prepared by the process of the invention by solution polymerisation may have a syndiotactic content higher than that obtained for the same homopolymer or copolymer prepared by a well established solution living anionic polymerisation process. In some cases there is good control of the molecular weight of the product polymer.

The present invention is illustrated by reference to the following examples.

EXAMPLE 1

Preparation of Compound (I)—N,N ethylenebis (3, 5-di-tertbutylsalicylidene imine) Methyl Aluminium (i) Preparation of N,N ethylenebis (3,5-di-tertbutylsalicylidene imine)

A solution of 3,5-di-tertbutylsalicylaldehyde (3 g, 12.8 mmol) in ethanol (150 ml) was prepared. To this ethylene diamine (0.43 ml, 6.4 mmol) was added via syringe with stirring. The solution was heated to reflux for 15 minutes then allowed to cool to room temperature to allow crystals of N,N ethylenebis (3,5-di-tertbutylsalicylidene imine) to develop. These were isolated by filtration.

(ii) Preparation of N,N ethylenebis (3,5-di-tertbutylsalicylidene imine) Methyl Aluminium A solution of trimethylaluminium in toluene (21.1 mmol, 10.6 ml) was added dropwise to a stirred solution of N,N ethylenebis (3,5-di-tertbutylsalicylidene imine) methyl aluminium (9.53 g, 19.3 mmol) in toluene (100 ml). The resulting solution was heated to reflux for 12 hours. The volatiles were removed under vacuum and compound (I) extracted into methylcyanide (200 ml). The solution was filtered and cooling to room temperature afforded crystals of compound (I).

EXAMPLE 2

Preparation of Polymethylmethacrylate (PMMA)

A solution of MMA (1 g, 200 mole equivalent of compound (I)) in dichloromethane (2 ml) (DCM) was prepared in a flask under nitrogen. Into a second flask N,N ethylenebis (3,5-di-tertbutylsalicylidene imine) methyl aluminium (26.6 mg, 0.05 mmol) nickel (acetylacetonate)$_2$ (12.8 mg, 0.05 mmol) and methylaluminium bis(2,6-di-tert-butyl-4-meithylphenoxide) (72.0 mg, 0.15 mmol) were added under nitrogen. The MMA in DCM was added to the second flask and the reaction mixture was stirred for 5 minutes. Methanol (0.5 ml) was added to quench the reaction and the reaction mixture was diluted with DCM (10 ml). The PMMA was precipitated from a 10 fold excess of acidified (1% concentrated hydrochloric acid) methanol. The percentage yield of PMMA was 90%. The properties of PMMA are illustrated in Table 1.

In this example the molar ratio of compound (I) to compound (II) to compound (III) was 1:1:3 and compound (I) is as described in Example 1. Compound (II) is nickel (acetylacetonate)$_2$ and compound (III) is methylaluminium bis(2,6-di-tert-butyl-4-methylphenoxide).

EXAMPLE 3

Preparation of PMMA

Example 2 was repeated except the amount of methylaluminium bis(2,6-di-tert-butyl-4-methylphenoxide) had been changed to 192 mg, 0.4 mmol. In this example the molar ratio of compound (I) to compound (II) to compound (III) was 1:1:8 and the percentage yield of PMMA was 88.1%. The properties of PMMA are illustrated in Table 1.

EXAMPLE 4

Preparation of Polybutylmethacrylate (PBMA)

Example 2 was repeated except the MMA had been replaced by butylmethacrylate (1 g). The percentage yield of PBMA was 90%. The properties of PBMA are illustrated in Table 1.

EXAMPLE 5

Preparation of Polymethylmethacrylate (PMA)

Example 2 was repeated except the MMA had been replaced by methyl acrylate (1 g) and the amount of methylaluminium bis(2,6-di-tert-butyl-4-methylphenoxide) had been changed to 24 mg, 0.05 mmol. in this example the molar ratio of compound (I) to compound (II) to compound (III) was 1:1:1 and the percentage yield of PMA was 91%. The properties of PMA are illustrated in Table 1.

EXAMPLE 6

Preparation of Polyvinylacetate (PVA)

Example 2 was repeated except the MMA in DCM had been replaced by a solution of vinyl acetate (1 g, 232 mole equivalent) in tetrahydrofuran (2 ml) (THF). The reaction mixture was stirred for 16 hours. The percentage yield of PVA was 16% and the properties are illustrated in Table 1.

EXAMPLE 7

Preparation of Polylaurylmethacrylate (PLMA)

Example 2 was repeated except the MMA in DCM had been replaced by a solution of lauryl methacrylate (1 g, 79 mole equivalent) in toluene (2 ml). The percentage yield of PLMA was 80% and the properties are illustrated in Table 1.

EXAMPLE 8

Preparation of Poly(2-ethylhexyl methacrylate) (PEHMA)

Example 2 was repeated except the MMA in DCM had been replaced by a solution of 2-ethylhexyl methacrylate (1 g, 101 mole equivalent) in toluene (2 ml). The percentage yield of PEHMA was 85% and the properties are illustrated in Table 1.

EXAMPLE 9

Preparation of Poly(i-bornyl methacrylate) (Pi-BMA)

Example 2 was repeated except the MMA in DCM had been replaced by a solution of i-bornyl methacrylate (1 g, 90 mole equivalent) in toluene (2 ml). The percentage yield of Pi-BMA was 90% and the properties are illustrated in Table 1.

EXAMPLE 10

Preparation of Polystyrene (PS)

Example 2 was repeated except the MMA in DCM had been replaced by a solution of styrene (1 g, 192 mole equivalent) in toluene (2 ml) The percentage yield of PS was 45% and the properties are illustrated in Table 1.

EXAMPLE 11

Preparation of Block Copolymer of PMMA with PBMA

The PMMA prepolymer was as formed as in Example 2, except the DCM had been replace by tetrahydrofuran (THF) (2 ml) and the reaction was stopped after 90 minutes. To 50% by weight of this solution a solution of BMA (0.5 g) in DCM (2 ml) was added. The resulting solution was stirred for 3 hours. Quenching and precipitation of the polymer was as described in Example 1. The percentage yield of PMMA/PBMA was 92%.

The PMMA prepolymer had an actual molecular weight of 25,300 compared to the calculated value of 20,000. The polydispersity was 1.19 and the percentage syndiotacticity was 74%. The block copolymer had an actual molecular weight of 55,400 compared to the calculated value of 40,000 and a polydispersity of 1.27. The properties of the homopolymers prepared in the presence of the catalyst system in Examples 2 to 10 are illustrated in Table 1.

TABLE 1

| Polymer | $M_n$ Actual ($M_n$ predicted) | Polydispersity | % Syndiotacity |
|---|---|---|---|
| Example 2 | 24700 (20000) | 1.17 | 69 |
| Example 3 | 45303 (20000) | 1.46 | not measured |
| Example 4 | 22500 (20000) | 1.24 | not measured |
| Example 5 | 41500 (20000) | 1.6 | not measured |
| Example 6 | 2046 (20000) | 1.9 | not measured |
| Example 7 | 55800 (20000) | 1.4 | not measured |
| Example 8 | 39900 (20000) | 1.5 | not measured |
| Example 9 | 71500 (20000) | 1.2 | not measured |
| Example 10 | 59000 (20000) | 2.2 | not measured |

The PMMA tacticity was calculated by measuring the relative integrals of the triad (three consecutive monomer units) signals from the $^1$H NMR of PMMA at 250 MHz on a Bruker AC-250 machine. These triads correspond to syndiotactic, isotactic and heterotactic content.

$M_n$ and polydispersity values were determined by Gel Permeation Chromatography (GPC). The GPC detector used was a Knauer differential refractometer with Viscotek Trisec software. Samples were injected on to two linear 10 micron columns (calibrated using polystyrene standards) using chloroform as eluant at a flow rate of 1 ml/min.

EXAMPLE 12

Preparation of PMMA

Example 2 was repeated except nickel (acetylacetonate)$_2$ had been replaced by cobalt (acetylacetonate)$_2$ and the reaction time was 1 hour. The percentage yield of PMMA was 36%. The properties of PMMA are illustrated in Table 2.

EXAMPLE 13

Example 2 was repeated except nickel (acetylacetonate)$_2$ had been replaced by nickel (cyclooctadiene)$_2$. The percentage yield of PMMA was 90%. The properties of PMMA are illustrated in Table 2.

TABLE 2

| Polymer | $M_n$ Actual ($M_n$ predicted) | Polydispersity | % Syndiotacticity |
|---|---|---|---|
| Example 12 | 58600 (20000) | 1.76 | 73 |
| Example 13 | 56200 (20000) | 1.21 | 70 |

EXAMPLE 14

Example 2 was repeated except the amount of MMA was 2.5 g, 500 mole equivalent of compound (I), reaction temperature was −20° C. and the reaction time was one hour. The percentage yield of PMMA was 93%. The properties of PMMA are illustrated in Table 3.

EXAMPLE 15

Example 14 was repeated except the reaction temperature was −40° C. and the reaction time was 3 hours. The percentage yield of PMMA was 96%. The properties of PMMA are illustrated in Table 3.

TABLE 3

| Polymer | $M_n$ Actual ($M_n$ predicted) | Polydispersity | % Syndiotacticity |
|---|---|---|---|
| Example 14 | 83400 (50000) | 1.16 | 81 |
| Example 15 | 83100 (50000) | 1.24 | 84 |

What is claimed is:

1. A living polymerisation process for the preparation of vinylic polymers from the corresponding vinylic monomers which process comprises the step of reacting a vinylic monomer in the presence of a catalyst system comprising a) a compound of general formula (1)

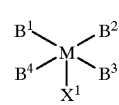

(I)

where M represents aluminum, cobalt, copper, titanium or a lanthanide series metal; $B^1$, $B^2$, $B^3$ and $B^4$ are chosen from nitrogen, oxygen, sulphur or phosphorus containing moieties wherein each of said nitrogen, oxygen, sulphur or phosphorus is linked to at least one carbon atom of an organic group and to M; $X^1$ represents alkyl, H, halogen, alkoxy, thiol, aryloxy, or ester, b) a metal complex of general formula (II)

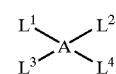

(II)

where A represents nickel, iron, cobalt, chromium, manganese, titanium, zirconium, vanadium or a rare earth metal; $L^1$, $L^2$, $L^3$ and $L^4$ are ligands and c) a Lewis acid of general formula (III)

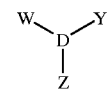

wherein at least one of W, Y or Z is capable of forming a co-ordination bond with A and the others of W, Y and Z are bulky groups; D represents aluminum, magnesium, zinc or boron.

2. A polymerisation process as claimed in claim 1 wherein the vinylic monomer is chosen from alkyl (alk)acrylic acid, esters thereof, functionalised alkyl(alk)acrylic acid or esters thereof.

3. A polymerisation process as claimed in claim 1 wherein the linkage of each of nitrogen, oxygen, sulphur or phosphorus to at least one carbon atom of an organic group in compound (I) is such that there is at least one linkage, comprising a bridging group of at least one carbon atom, between any two of nitrogen, oxygen, sulphur or phosphorus.

4. A polymerisation process as claimed in claim 3 wherein compound (I) is an open structure which allows directed access for the reactants to the M-X bond.

5. A polymerisation as claimed in claim 1 wherein A, in compound (II) is preferably iron, cobalt or nickel.

6. A polymerisation as claimed claim 1 wherein the ligands $L^1$, $L^2$, $L^3$ and $L^4$, in compound (II), are chosen from all monodentate, a combination of 2 mono and 1 bidentate ligand or 2 bidentate ligands.

7. A polymerisation as claimed in claim 1 wherein D, in compound (III), is aluminium.

8. A polymerisation as claimed in claim 1 wherein one of the groupings W, Y or Z in compound (III) is an alkyl group with $C_1$ to $C_{10}$ carbon atoms.

9. A polymerisation as claimed in claim 1 wherein the ratio of the number of moles of compound (I) to moles of compound (II) ranges from 1:0.01 to 1:100.

10. A polymerisation as claimed in claim 1 wherein the ratio of the number of moles of compound (I) to moles of compound (III) ranges from 1:0.1 to 1:100.

11. A polymerisation process according to claim 2, for the homopolymerisation of said vinylic monomer.

12. A polymerisation process according to claim 2, for the copolymerisation of said vinylic monomers.

13. A polymerisation process according to claim 1, wherein the step of reacting vinylic monomer is the presence of the catalyst is carried out in the presence of solvent at a temperature in the range of from −50 to 50° C.

14. A polymerisation process according to claim 1, wherein M represents aluminum, $X^1$ represents alkyl group with from 1 to 10 carbon atoms, A represents iron, cobalt or nickel, D represents aluminum, at least one of W, Y or Z represents alkyl with from 1 to 10 carbon atoms and the others of W, Y and Z represent phenoxide or thiolate groups.

15. A polymerisation process according to claim 1, wherein the ratio of the number of moles of compound (I) to moles of compound (II) ranges from 1:0.3 to 1:10.

16. A polymerisation process according to claim 1, wherein the ratio of the number of moles of compound (I) to moles of compound (III) ranges from 1:0.3 to 1:10.

\* \* \* \* \*